United States Patent
Buffoli et al.

(10) Patent No.: US 12,263,552 B2
(45) Date of Patent: Apr. 1, 2025

(54) APPARATUS FOR MACHINING HUBS FOR VEHICLES

(71) Applicant: Buffoli Transfer S.p.A., Brescia (IT)

(72) Inventors: Edoardo Buffoli, Brescia (IT);
Francesco Buffoli, Brescia (IT)

(73) Assignee: Buffoli Transfer S.p.A., Brescia (IT)

( * ) Notice: Subject to any disclaimer, the term of this patent is extended or adjusted under 35 U.S.C. 154(b) by 181 days.

(21) Appl. No.: 17/804,349

(22) Filed: May 27, 2022

(65) Prior Publication Data
US 2022/0379424 A1    Dec. 1, 2022

(30) Foreign Application Priority Data

May 27, 2021 (IT) .......................... 102021000013850

(51) Int. Cl.
*B23Q 39/04* (2006.01)
*B23Q 11/00* (2006.01)
*B23Q 41/02* (2006.01)

(52) U.S. Cl.
CPC ........ *B23Q 39/046* (2013.01); *B23Q 11/0032* (2013.01); *B23Q 39/048* (2013.01); *B23Q 41/02* (2013.01); *Y10T 29/5124* (2015.01); *Y10T 29/5136* (2015.01)

(58) Field of Classification Search
CPC .......................... B23Q 7/16–18; B23Q 39/042; B23Q 39/044; B23Q 39/046; B23Q 39/048; B23Q 41/02; B23Q 11/0032; Y10T 29/5124; Y10T 29/5127–5129; Y10T 29/5136
USPC ............ 29/38 A, 38 B, 38 C, 38 R, 563, 564
See application file for complete search history.

(56) References Cited

U.S. PATENT DOCUMENTS

| | | | | |
|---|---|---|---|---|
| 2,942,527 A | * | 6/1960 | Bowen ................. | B23Q 39/046 414/223.01 |
| 4,987,765 A | * | 1/1991 | Nishimura ........... | B21D 43/105 83/563 |
| 5,815,902 A | * | 10/1998 | Osterried ............. | B23Q 39/048 29/563 |
| 2011/0000063 A1 | * | 1/2011 | Sueoka ................. | B23P 21/006 29/33 P |

(Continued)

FOREIGN PATENT DOCUMENTS

| | | | | |
|---|---|---|---|---|
| DE | 19504368 A1 | * | 8/1996 | .......... B23Q 39/046 |
| JP | 01274934 A | * | 11/1989 | |
| WO | WO-2020208526 A1 | * | 10/2020 | ............. B23Q 39/04 |

*Primary Examiner* — Sunil K Singh
*Assistant Examiner* — Michael Vitale
(74) *Attorney, Agent, or Firm* — INNOVATION CAPITAL LAW GROUP, LLP; Vic Lin

(57) ABSTRACT

Apparatus for machining hubs for vehicles, comprising a first machining group (11) having a first number (n1) of first stations, an inbound transfer station (11a), an outbound transfer station (11b), a loading station (117) and an unloading station (118); a second machining group (12) having a second number (n2) of second stations, an inbound transfer station (12a) and an outbound transfer station (12b); a first rotating table (13) having a number of first workpiece-holder sectors (131) equal to the first number (n1); where the first sectors (131) face the first stations; a second rotating table (14) having a number of second sectors (141) equal to said second number (n2); the second sectors (141) face the second stations; a first transfer group (15) for transferring workpieces between the first machining group (11) and the second machining group (12).

10 Claims, 3 Drawing Sheets

(56) References Cited

U.S. PATENT DOCUMENTS

2012/0326372 A1* 12/2012 Olson ................ B21D 51/2615
            413/69
2017/0274553 A1* 9/2017 Martinez .................. B27M 3/18
2019/0118574 A1* 4/2019 Rimpl ..................... B44B 5/024

* cited by examiner

APPARATUS FOR MACHINING HUBS FOR VEHICLES

TECHNICAL SECTOR

The present invention relates to an apparatus for machining hubs for vehicles and, in particular, for turning operations involving further machining of the workpiece so that opposite portions may be successively machined.

BACKGROUND

Nowadays, apparatus for machining hubs for vehicles by means of turning, drilling and tapping, with further machining, according to a programmed sequence of operations are known.

Such conventional apparatus has two series of stations, in-line or with a rotating table, where a first series deals with the machining of a first side of the hub and the second series deals with the machining of the second side of the hub, namely in the two series of stations the hubs are machined at opposite ends with respect to their axis.

The semi-finished articles, namely the hubs which have undergone some of all the machining operations envisaged, are transferred from the stations of the first series to the stations of the second series where each series has a plurality of machines arranged in succession.

Where, as in the case of machining of vehicle hubs, very small position and concentricity tolerances are required, the machining operations involved for each side of the hub must be carried out in a single pass, namely without further machining of the workpiece.

Thus, the productivity of these conventional apparatus depends on the time required to perform the set of machining operations, which requires a longer execution time since the workpieces undergoing more rapid machining are queued up waiting for the longer machining operations.

With particular reference to the machining of vehicle hubs, these are subject to three main machining phases.

A first machining phase relates to turning of a first axial side of the hub, which is gripped along its second axial side.

A second machining phase involves the further machining of the hub along its surfaces machined during the first machining phase and turning of the second axial side of the hub for ensuring the coaxiality and concentricity of the machined surfaces during turning of the second side with respect to the surfaces machined during the first machining phase.

A third machining phase involves the further machining of the hub along its surfaces machined during the first machining phase and the execution of finishing or completion operations, such as a hole-drilling operation, checking of the holes, as well chamfering and tapping thereof.

These conventional apparatuses have a main drawback due to the fact that the machining operations are carried out by different independent machines, thereby compromising the structural simplicity and compactness of the conventional apparatus.

Therefore, the conventional apparatuses have numerous transfer devices, specifically one for each working position with a consequent high constructional complexity.

Furthermore, the conventional apparatuses are subject to long downtime due to the replacement of worn tools which require stoppage of the apparatus for the time needed to replace them, In particular the machining of vehicle hubs is particularly demanding on the turning tools with consequent relatively frequent replacement thereof, thus compromising the optimum productivity of the plant.

SUMMARY OF THE INVENTION

The problem underlying the present invention is therefore that of increasing the productivity of the conventional apparatus for the machining in particular of vehicle hubs.

The task of an apparatus for machining hubs for vehicles, according to the present invention, is therefore that of solving this problem.

In connection with this task an object of the invention is to propose an apparatus for machining hubs for vehicles which allows simplification of the management and movement of the workpieces to be machined.

In connection with this task, one object of the invention is to provide an apparatus for machining hubs for vehicles which allows the overall dimensions to be reduced significantly for the same productivity.

Another object of the present invention is to propose an apparatus for machining hubs for vehicles which facilitates the containment and the disposal of machining swarf.

A further object of the present invention is to provide an apparatus for machining hubs for vehicles which allows the system for lubricating and cooling the workstations to be simplified and made more compact.

Yet another object of the present invention is to reduce drastically the impact, on the productivity of the said apparatus, of the time needed for tool replacement or maintenance of a workstation.

This task, as well as these and other objects which will become clearer below are achieved by an apparatus for machining hubs for vehicles according to the attached independent claim.

Detailed characteristics features of the apparatus for machining hubs for vehicles, according to the invention, are contained in the dependent claims.

Further characteristic features and advantages will emerge more clearly from the description of a preferred, but non-exclusive embodiment of an apparatus for machining hubs for vehicles according to the invention, with the aid of the drawings proposed by way of a non-limiting example, in the attached illustrations and listed below.

DETAILED DESCRIPTION

Figure 1:
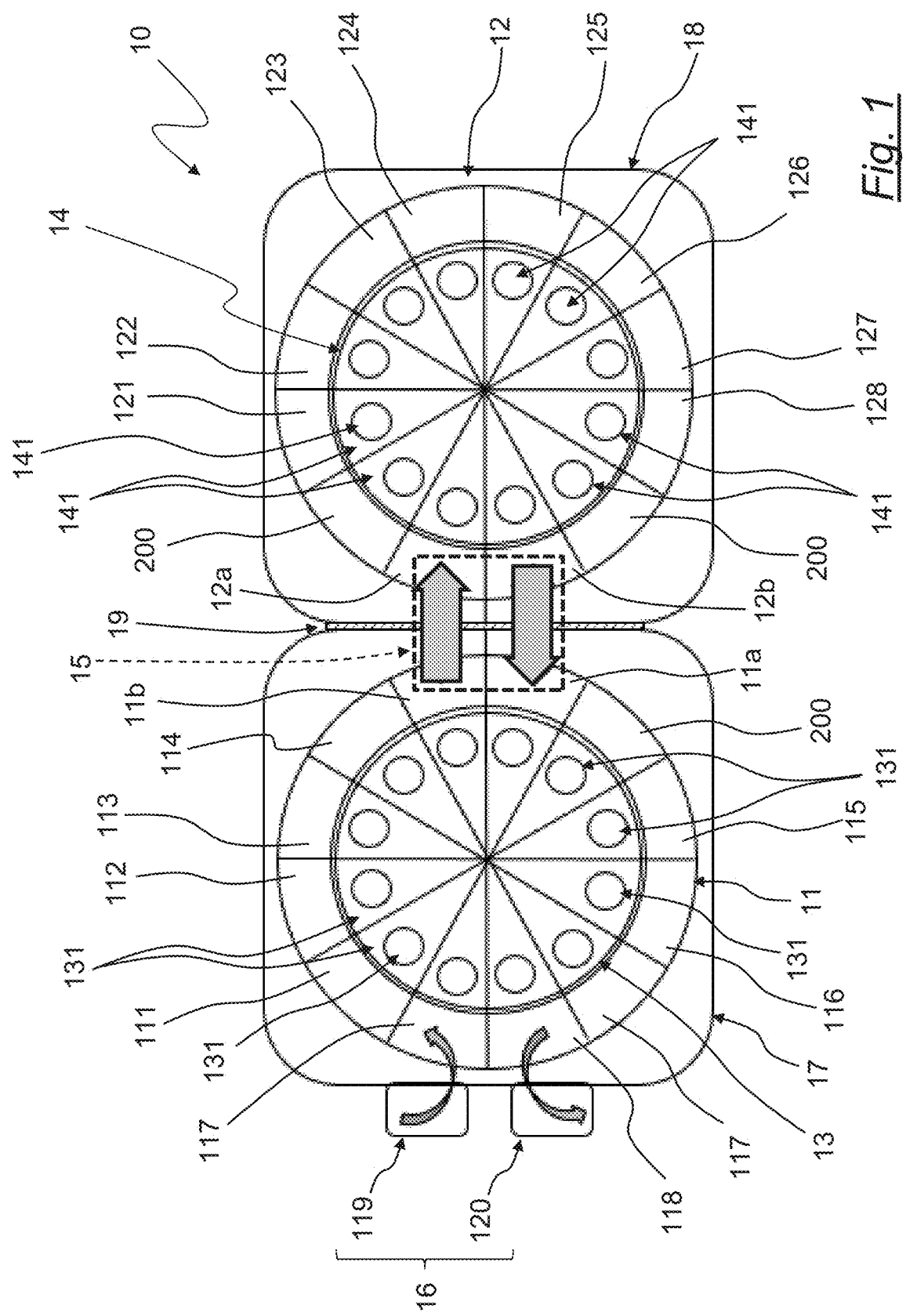
FIG. 1 shows a simplified plan view of the apparatus for machining hubs for vehicles according to the invention.

With particular reference to the said figures. 10 denotes overall an apparatus for machining hubs for vehicles comprising:
- a first machining group 11;
- a second machining group 12;
- a first rotating table 13 having first workpiece-holder sectors 131 facing the first machining group 11;
- a second rotating table 14 having second workpiece-holder sectors 141 facing the second machining group 12;

a first transfer group 15 configured to transfer workpieces between the first machining group 11 and the second machining group 12.

A second transfer group 16 may be provided for loading and unloading workpieces into/from the first machining group 11 for example by means of a loading group 119 and an unloading group 120.

The first machining group 11 has a first number n1 of first stations which, in general, comprise:
- at least one first machining station 111, 112, 113, 114, for example four first machining stations as shown in the example of the attached figures;
- an inbound transfer station 11a;
- an outbound transfer station 11b;
- a loading station 117, which may face the loading group 119; and
- an unloading station 118, which may face the unloading group 129.

The second machining group 12 has a second number n2 of second stations which comprise, in general:
- at least one second machining station 121, 122, 123, 124, 125, 126, 127, 128, for example eight second machining stations as shown in the example of the attached figures;
- an inbound transfer station 12a;
- an outbound transfer station 12b;

The first rotating table 13 has a number of first workpiece-holder sectors 131 equal to the first number n1 so that, during operation, a first sector 131 can face each of the first stations of the first machining group 11.

In other words, the first machining group 11 and the first rotating table 13 are configured and mutually arranged in such a way that the first sectors 131 can face the first stations in order to feed to them workpieces to be machined and unload machined workpieces from them.

The second rotating table 14 has a number of second workpiece-holder sectors 141 equal to the second number n2.

The second machining group 12 and the second rotating table 14 are configured and mutually arranged in such a way that the second sectors 141 can face the second stations in order to feed to them workpieces to be machined and unload machined workpieces from them.

In general, the number of first and second sectors 131, 141 of the respective first and second rotating tables 13 and 14 could be greater than the respective first and second numbers n1, n2 of the first and second stations of the first and second machining groups 11, 12.

In particular, the first and second machining groups 11, 12 may have respectively the first and second stations arranged side-by-side along a circular trajectory so as to be arranged around the first rotating table 13 and the second rotating table 14, respectively.

This circular trajectory is preferably concentric with respect to the first and second rotating tables 13 and 14, namely is centred with respect to the axis of rotation thereof.

The apparatus 10 may comprises motor means which are able to rotationally drive the first and second rotating tables 13 and 14.

These motor means may be configured or operated so as to rotate the first and second rotating tables 13 and 14 intermittently by an angular step.

This angular step is chosen so that, following each angular step, a sector 131 or 141 is located facing, respectively, a first or second machining group 11, 12 directly following that which it was facing before being moved through said angular step, in the direction of rotation of the respective rotating table 13 or 14.

The motor means may be configured to perform the movement of the first rotating table 13 independently of that of the second rotating table 14.

Preferably, the motor means are configured to synchronize the movement of the rotating tables 13 and 14.

The first transfer group 15 is configured to transfer workpieces from the outbound transfer station 11b of the first machining group 11 to the inbound transfer station 12a of the second machining group 12 and to transfer workpieces from the outbound transfer station 12b of the second machining group 12 to the inbound transfer station 11a of the first machining group 11.

With the apparatus 10 it is therefore possible to perform two series of operations in sequence, resulting in a major reduction in the overall dimensions compared to conventional solutions, these two series of operations being performed, independently of the first machining group 11 and the second machining group 12 respectively, which extend around the two rotating tables 13 and 14.

In particular, the dimensions of an apparatus 10 according to the present invention are greatly reduced compared to both a conventional apparatus which has a linear extension and an apparatus which uses a single rotating table around which all the machining stations are arranged.

Moreover, with the apparatus 10 according to the present invention it is possible to achieve a productivity with production times per workpiece which are a fraction of the machining times of the first machining group 11 and the second machining group 12, as will emerge more clearly below.

This advantage may moreover be obtained also, and in particular, in those applications where the production times of the first machining group 11 and the second machining group 12 are different.

In fact, the productivity in this case is a common fraction of these machining times which depends on the number of first and second machining stations 111-114 121-128.

It will therefore be possible to realize an apparatus according to the present invention satisfying the requirements of reducing the overall dimensions and obtaining a high productivity by regulating the number of first and second machining stations 111-114, 121-128.

Therefore, in an apparatus 10 according to the present invention it is possible to prevent or limit any vibrations related to the feeding of workpieces inside the first machining group 11 and/or the second machining group 12 from spreading between the said machining groups 11 and 12 so as to avoid micro defects in the workpieces being machined in one of the machining groups 11 or 12 following movement of the workpieces between the stations of the other one of the machining groups 12 or 11.

In particular, the first transfer group 15 may comprise two pairs of handling devices, not shown, where a first pair is designed to transfer workpieces from the outbound transfer station 11b of the first machining group 11 to the inbound transfer station 12a of the second machining group 12.

The second pair is designed to transfer workpieces from the outbound transfer station 12b of the second machining group 12 to the inbound transfer station 11a of the first machining group 11.

These pairs of handling devices may each comprise:
- a first handling device which is configured to grip a workpiece from the sector 131 or 141 facing it and rotate it through 180°;

a second handling device which is configured to grip the workpiece from the first handling device and position on the sector 141 or 131, respectively, which is waiting to receive it.

The first machining group 11 may comprise a third number n3 of first machining stations 111, 112, 113, 114 which, in the example of the figures, is equal to 4, where these first machining stations 111, 112, 113, 114 all perform the same machining operation which requires a first machining time.

Figure 3:
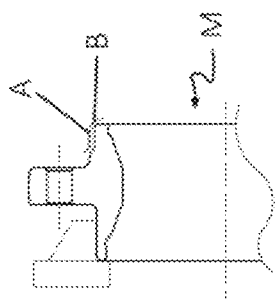
FIGS. 3 and 4 show an example of a diagram of the machining operations which can be carried out by an apparatus according to the present invention.

For example, this first machining operation may be turning of a first outer cylindrical surface A and a first front face B of a hub M, as can seen for example in FIG. 3.

The second machining group 12 comprises a third number n4 of the second machining stations 121, 122, 123, 124, 125, 126, 127, 128 which, in the example of the figures, is equal to 8, where these second machining stations all perform the same machining operation which requires a second machining time.

Figure 4:
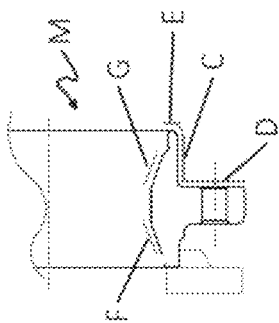

This machining operation may comprise turning of a second outer cylindrical surface C and of a second and third front face D and E of the hub M, as well as turning of two inner surfaces F and G of the hub M such as those visible in FIG. 4 which shows the hub of FIG. 3 gripped in the region of the previously machined outer cylindrical surface A.

The third number n3 and the fourth number n4 are chosen so that the first machining time t1 divided by the third number n3 is equal to the second machining time t2 divided by the fourth number n4 which is equal to a switching time tsc, namely expressed as a formula t1/n3=t2/n4=tsc.

The motor means may be configured to cause synchronous rotation of the first and second rotating tables 13 and 14 upon lapsing of each switching time tsc of the said angular step.

Thus, upon lapsing of each switching time tsc each sector 131 and 141 is rotated so as to face a following station of the first machining stations 111, 112, 112, 114 and second machining stations 121, 122, 123, 124, 125, 126, 127, 128 respectively.

In the example shown in the attached figures, the first machining time may be 20 seconds, the second machining time may be 40 seconds and the switching time therefore is equal to 5 seconds.

The first transfer group 15 may be configured to transfer a workpiece from the first machining group 11 to the second machining group 12 and a workpiece from the second machining group 12 to the first machining group 11 at a rate equal to one workpiece for each switching time.

The apparatus 10 may comprise at least one finishing or completion station which is part of the first stations if the third number n3 is less than the fourth number n4 or which is part of the second stations if third number n3 is greater than the fourth number n4.

In other words, the at least one finishing station may be incorporated in either one of the first machining group 11 and the second machining group 12 which has a smaller number of machining stations 111-114 or 121-128.

The at least one finishing station may comprise, for example as shown in the example of the attached figures:
- a first finishing station 115 for drilling a hole in the workpiece to be machined;
- a second finishing station 116 for chamfering holes drilled in the first finishing station 115;
- a third finishing station 117 for performing tapping of the holes.

The first machining stations 111, 112, 113, 114 may be configured to machine a first axial side of a wheel hub for vehicles according to a first machining operation and the second machining stations 121, 122, 123, 124, 125, 126, 127, 128 are configured to machine a second axial side of the hub, opposite to the first axial side, according to a second machining operation, where the first machining time of the first machining operation is half the second machining time of the second machining operation.

Each first machining station 111, 112, 113, 114 and each second machining station 121, 122, 123, 124, 125, 126, 127, 128 may comprise a lathe with a static tool configured to perform finish-machining of said hub where the first machining operation and the second machining operation comprise at least one coaxially constrained surface turning operation.

The first machining group 11 and the second rotating table 13 may be mounted on a first base 17.

The second machining group 12 and the second rotating table 14 may be mounted on a second base 18.

The motor means may comprise at least one motor, for example an electric motor, which may be mounted on the base, for example coaxially with the respective rotating table 13, 14 or in a circumferential position with respect to the latter, so as to rotationally operate it.

Said electric motor preferably is a brushless motor, dc synchronous motor, or stepper motor.

In order to limit the dimensions and optimize the functional and logistical efficiency, the first base 17 and the second base 18 may be joined together so as to minimize a distance between the inbound transfer station 12a of the second machining group 12 and the outbound transfer station 11b of the first machining group 11 and between the inbound transfer station 11a of the first machining group 11 and the outbound transfer station 12b of the second machining group 12.

The apparatus 10 may also comprise damper 19 which is configured to damp vibrations and which is placed between the first base 17 and the second base 18 in order to counteract the transmission of vibrations between them.

In this way, the movement of the workpieces to be machined, by means of rotation of one of the rotating tables 13, 14, in one of the machining groups 11 or 12, does not negatively interfere with the machining operations performed in the other one of the machining groups 11 or 12.

The first sectors 131 and second sectors 141 each comprise two support devices for carrying a machined workpiece and workpiece to be machined.

For example, these support devices may each comprise a hydraulic clamp or consist of said clamp, where said hydraulic clamp is configured to retain a hub, for example as can be seen in FIGS. 3 and 4 where one of the jaws of the clamp is visible on the left-hand side.

In order to reduce the plan-view dimensions of the apparatus 10, the support devices may be vertically arranged above each other so as to minimize the dimensions of the first sectors 131 in the circumferential direction with respect to the first rotating table 13 and so as to minimize the dimensions of the second sectors 141 in the circumferential direction with respect to the second rotating table 14, respectively.

Each of the first and second machining stations 111-114, 121-128 may comprise a turning member and a movement member, for example a robotic arm, which is configured to transfer to the turning member a workpiece to be machined, removing it from one of the first and second sectors 131 or 141 facing respectively the first or second machining station 111-114 or 121-128 and transfer a machined workpiece from the turning member to the first or second sectors 131, 141.

Figure 2:
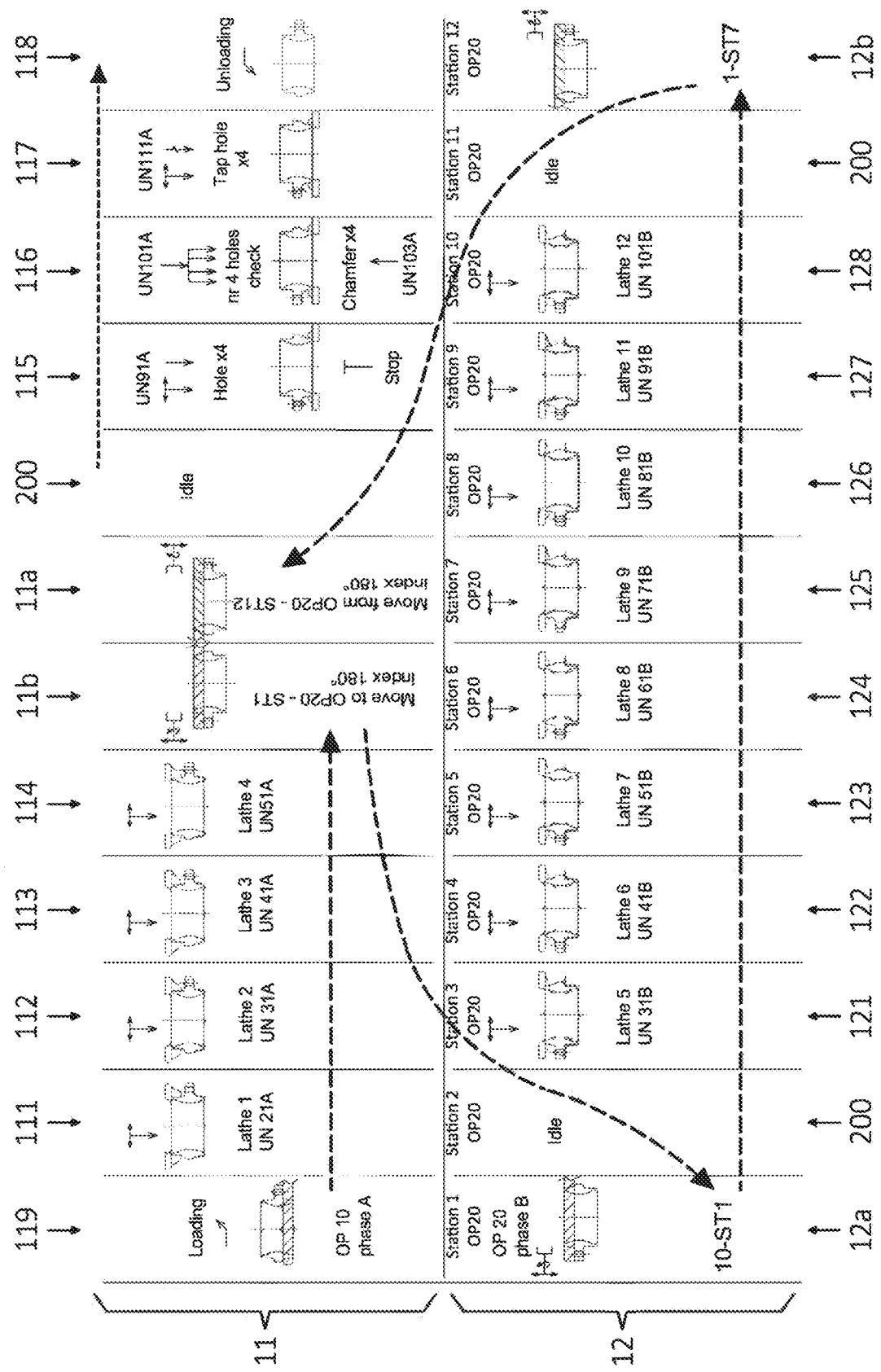
FIG. 2 shows a stylized diagram of the sequence of the operations which may be carried out in an example of embodiment of the apparatus according to FIG. 1.

FIG. 2 shows an exemplary sequential diagram of the possible machining operations which can be performed in the respective first and second machining stations 111-114 and 121-128 of the first and second machining groups 11 and 12.

In this figure, the movement sequence of the workpieces received from the rotating tables by the first and second machining stations 111-114 and 121-128 is indicated by way of example means of the arrows shown in broken lines.

Depending on the particular implementation requirements of the present invention, the machining stations of the first and second machining groups 11 and 12 may also comprises inactive stations 200.

Functionally speaking, the apparatus 10 may operated so that, at each switching time, the loading group 119 loads by means of the loading station 117 a workpiece to be machined onto a sector 131 of the first rotating table 13, for example onto the top support device of the latter.

Upon lapsing of the switching time tsc the first rotating table 13 rotates, bringing the loaded workpiece opposite the first 111 of the first machining stations 111-114 which picks up the workpiece to be machined.

At the same time, the loading group 119 loads onto a sector 131 by means of the loading station 117 a further workpiece to be machined.

The picking up of the workpiece to be machined from the top support device of the sector 131 may be performed by means of an extendable spindle of the lathe of the respective machining station 111-114 which may be retracted so as to bring the rotating workpiece into contact with the turning tool.

Once machining has been completed, the workpiece is unloaded into the bottom support of the sector 131 of the first rotating table 13.

In this way, at each switching time, workpieces are loaded onto and unloaded from the respective machining stations 111-114 so that, at each switching time, a machined workpiece arrives facing the outbound transfer station 11*b* of the first rotating table 13, and is transferred to the inbound transfer station 12*a* of the second rotating table 14 into which it is unloaded onto the top support device of the second sector 141 facing it.

At each switching time tsc the second rotating table 14 also rotates so that the workpieces to be machined face in succession the respective second machining stations 121-128, from each of which, during operation, a machined workpiece is unloaded for example onto the bottom support device of the second sector 141 and onto which a workpiece to be machined carried by the top support device of the same second sector 141 is loaded.

Similarly, the workpieces machined by the second machining group are transferred from the second rotating table 14 to the first rotating table 13 so that the said finishing machining operations may be performed.

Then, at a rate of one finished workpiece for each switching time, the unloading group 120 unloads from the apparatus 10 a finished workpiece by means of the unloading station 118.

It can therefore be understood how, with an apparatus 10 according to the present invention, it is possible to perform a conventional turning production cycle, but using a plurality of processes in parallel, thus ensuring a productivity which is drastically increased compared to the conventional solutions.

One benefit compared to a conventional solution, which would envisage the use of several machines in series, consists in particular in the concentration of all the machining operations within a single extremely compact apparatus which allows in particular the following advantages to be achieved:

- elimination of the management and movement of the workpieces, since there is a single loading and unloading position where the loading and unloading groups 119, 120 may be jointly arranged;
- significant saving in the amount of workshop space;
- reduction in the amount of swarf and cooling lubricant and management thereof in a single evacuation device with centralized filtering and cooling treatment;
- concentricity of the machining operations ensured by the single gripping of workpieces;
- possibility of changing the tools of the single stations without having to stop the entire machine: the tool change-over of the individual machining station may in fact be performed during the continuous operation of the apparatus 10, something which would not be possible with the use of a sequential process typical of the conventional transfer apparatus.

It can therefore be understood how an apparatus 10 according to the present invention achieves the task and the predefined objects.

The invention thus devised may be subject to numerous modifications and variations, all of which fall within the scope of protection of the attached claims.

Moreover, all the details may be replaced by other technically equivalent elements.

Where the operational characteristics and the techniques mentioned are followed by reference numbers or symbols, these reference numbers or symbols have been assigned with the sole purpose of facilitating understanding of the description and the said claims and consequently they do not limit in any way the interpretation of each element which is identified, purely by way of example, by said reference numbers or symbols.

The invention claimed is:

1. An apparatus for machining hubs for vehicles comprising:
    a first machining group (11) having a first number (n1) of first stations, said first stations comprising at least one first machining station (111, 112, 113, 114), an inbound transfer station (11*a*), an outbound transfer station (11*b*), a loading station (117), and an unloading station (118);
    a second machining group (12) having a second number (n2) of second stations which comprise at least one second machining station (121, 122, 123, 124, 125, 126, 127, 128), an inbound transfer station (12*a*), and an outbound transfer station (12*b*),
    a first rotating table (13) having a number of first workpiece-holder sectors (131) equal to said first number (n1); wherein said first machining group (11) and said first rotating table (13) are mutually arranged in such a way that each first sector (131) is indexable so as to be disposed across from one of said first stations such that workpieces to be machined are transferred from each first sector to a corresponding one of the at least one first machining station and such that machined workpieces are transferred from each first sector to the outbound transfer station (11*b*) of the first machining group (11);
    a second rotating table (14) having a number of second workpiece-holder sectors (141) equal to said second number (n2); wherein said second machining group (12) and said second rotating table (14) are mutually arranged in such a way that each second sector (141) is indexable so as to be disposed across from one of said second stations such that the machined workpieces are transferred from each second sector to a corresponding one of the at least one second machining station and such that unload further machined workpieces are transferred from each second sector to the outbound transfer station (12b) of the second machining group (12);

a first transfer group (15) configured to transfer the machined workpieces from the outbound transfer station (11b) of said first machining group (11) to the inbound transfer station (12a) of the second machining group (12) and to transfer the further machined workpieces from the outbound transfer station (12b) of said second machining group (12) to the inbound transfer station (11a) of the first machining group (11), wherein said first machining group (11) comprises a third number (n3) of said at least one first machining station (111, 112, 113, 114), which all carry out a first same machining operation which requires a first machining time;

wherein said second machining group (12) comprises a fourth number (n4) of said at least one second machining station (121, 122, 123, 124, 125, 126, 127, 128), which all carry out a second same machining operation which requires a second machining time;

wherein said third number (n3) and said fourth number (n4) are chosen in such a way that both the first machining time divided by said third number (n3) and the second machining time divided by the fourth number (n4) are equal to a switching time;

wherein said first transfer group (15) is configured to transfer the machined workpieces from said first machining group (11) to said second machining group (12) and the further machined workpieces from said second machining group (12) to said first machining group (11) at a rate equal to one workpiece per switching time;

wherein said first machining group (11) and said first rotating table (13) are mounted on a first base (17) and wherein said second machining group (12) and said second rotating table (14) are mounted on a second base (18); said first base (17) and said second base (18) are joined together so as to minimize a distance between the inbound transfer station (12a) of the second machining group (12) and the outbound transfer station (11b) of said first machining group (11) and between the inbound transfer station (11a) of the first machining group (11) and the outbound transfer station (12b) of said second machining group (12); and wherein a damper, configured to damp vibrations, is placed between the first base (17) and the second base (18) in order to counteract a transmission of vibrations between said first base (17) and said second base (18).

2. The apparatus according to claim 1, which comprises at least one finishing station which is part of said first stations if said third number (n3) is less than said fourth number (n4) or is part of said second stations if said third number (n3) is greater than said fourth number (n4).

3. The apparatus according to claim 2, wherein said at least one finishing station comprises:
a first finishing station (115), for drilling a respective hole in each of the further machined workpieces;
a second finishing station (116), for chamfering each respective hole formed by said first finishing station (115); and
a third finishing station (117), for tapping each respective hole.

4. The apparatus according to claim 3,
wherein each of said at least one first machining station (111, 112, 113, 114) is configured to machine a first axial side of a wheel hub for vehicles according to a first machining operation and each of said at least one second machining station (121, 122, 123, 124, 125, 126, 127, 128) is configured to machine a second axial side of the hub, opposite to the first axial side, according to a second machining operation; and
wherein the first machining time of the first machining operation is half the second machining time of the second machining operation.

5. The apparatus according to claim 4,
wherein each of said at least one first machining station (111, 112, 113, 114) and each of said at least one second machining station (121, 122, 123, 124, 125, 126, 127, 128) comprises a respective lathe with at least one static tool configured to perform finishing of said hub, and
wherein said first machining operation and said second machining operation comprise at least one surface turning operation.

6. The apparatus according to claim 2,
wherein each of said at least one first machining station (111, 112, 113, 114) is configured to machine a first axial side of a wheel hub for vehicles according to a first machining operation and each of said at least one second machining station (121, 122, 123, 124, 125, 126, 127, 128) is configured to machine a second axial side of the hub, opposite to the first axial side, according to a second machining operation; and
wherein the first machining time of the first machining operation is half the second machining time of the second machining operation.

7. The apparatus according to claim 6,
wherein each of said at least one first machining station (111, 112, 113, 114) and each of said at least one second machining station (121, 122, 123, 124, 125, 126, 127, 128) comprises a respective lathe with at least one static tool configured to perform finishing of said hub, and
wherein said first machining operation and said second machining operation comprise at least one surface turning operation.

8. The apparatus according to claim 1,
wherein each of said at least one first machining station (111, 112, 113, 114) is configured to machine a first axial side of a wheel hub for vehicles according to a first machining operation and each of said at least one second machining station (121, 122, 123, 124, 125, 126, 127, 128) is configured to machine a second axial side of the hub, opposite to the first axial side, according to a second machining operation; and
wherein the first machining time of the first machining operation is half the second machining time of the second machining operation.

9. The apparatus according to claim 8,
wherein each of said at least one first machining station (111, 112, 113, 114) and each of said at least one second machining station (121, 122, 123, 124, 125, 126, 127, 128) comprises a respective lathe with at least one static tool configured to perform finishing of said hub, and wherein said first machining operation and said second machining operation comprise at least one surface turning operation.

10. The apparatus according to claim 1, wherein each of said first workpiece-holder sectors (131) and each of said second workpiece-holder sectors (141) comprises two respective supports for carrying one of the machined workpieces and one of the workpieces to be machined; and wherein said two respective supports devices are vertically arranged above each other so as to minimize the dimensions of said first workpiece-holder sectors (131) in the circumferential direction with respect to said first rotating table (13) and so as to minimize the dimensions of said second workpiece-holder sectors (141) in the circumferential direction with respect to said second rotating table (14).

* * * * *